United States Patent [19]

Thepaut et al.

[11] Patent Number: 5,465,375
[45] Date of Patent: Nov. 7, 1995

[54] MULTIPROCESSOR SYSTEM WITH CASCADED MODULES COMBINING PROCESSORS THROUGH A PROGRAMMABLE LOGIC CELL ARRAY

[75] Inventors: André Thepaut; Gerald Ouvradou, both of Plouzane, France

[73] Assignee: France Telecom, Paris, France

[21] Appl. No.: 4,582

[22] Filed: Jan. 14, 1993

[30] Foreign Application Priority Data

Jan. 14, 1992 [FR] France ................................ 92-00312

[51] Int. Cl.$^6$ .................................................. G06F 15/16
[52] U.S. Cl. ...................... 395/800; 364/137; 364/228.5; 364/229; 364/238.1; 364/238.2; 364/238.3; 364/DIG. 1
[58] Field of Search .................................. 395/200, 325, 395/800; 370/53, 85.9; 364/137

[56] References Cited

U.S. PATENT DOCUMENTS

| | | | |
|---|---|---|---|
| 4,200,930 | 4/1980 | Rawlings et al. | 395/200 |
| 4,365,294 | 12/1982 | Stokken | 395/325 |
| 4,380,046 | 4/1983 | Fung | 395/800 |
| 4,443,850 | 4/1984 | Harris | 395/275 |
| 4,663,706 | 5/1987 | Allen et al. | 395/200 |
| 4,720,780 | 1/1988 | Dolecek | 395/800 |
| 4,816,993 | 3/1989 | Takahashi et al. | 395/250 |
| 5,086,498 | 2/1992 | Tanaka et al. | 395/200 |
| 5,165,023 | 11/1992 | Gifford | 395/325 |
| 5,291,611 | 3/1994 | Davis et al. | 395/800 |

FOREIGN PATENT DOCUMENTS 433142 12/1990 European Pat. Off. .

OTHER PUBLICATIONS

S. Y. Kung; "Parallel Architectures for Artificial Neural Nets" IEEE 1988, pp. 163–174.
S. Y. Kung et al., "Parallel Architectures for Artificial Neural Nets"; IEEE International Conference on Neural Networks, San Diego, Calif. Jul. 24–27, 1988, 8 pages.

Primary Examiner—Krisna Lim
Attorney, Agent, or Firm—Jacobson, Price, Holman & Stern

[57] ABSTRACT

In a multiprocessor data processing system, modules are cascaded by means of intermodule buses. Each module comprises a data processing unit, a first memory, a logic cell array programmable into four input/output interfaces, a second memory and a specialized processing unit such as a digital signal processor (DSP). A first interface, the first memory and the data processing unit are interconnected by a module bus. A fourth interface, the second memory and the specialized processing unit are interconnected by another module bus. A feedback bus connects the second and third interfaces in the last and first modules for constituting a ring. Such a system is particularly intended for image recognition, such as digitalized handwritten digits for postal distribution.

2 Claims, 7 Drawing Sheets

MULTIPROCESSOR SYSTEM WITH CASCADED MODULES COMBINING PROCESSORS THROUGH A PROGRAMMABLE LOGIC CELL ARRAY

BACKGROUND OF THE INVENTION

1. Field of the Invention

This invention relates to multiprocessor data processing systems in general.

2. Description of the Prior Art

The increasingly greater computational throughput requirements in data processing systems for applications such as image processing or scientific computation, have led computer designers to introduce new processor architectures: parallel architectures. Three basic principles are used for introducing this parallelism in the new achitectures. The distinction is made between:

- segmented (or pipeline) architectures: this consists in breaking a task down into plural steps and in performing these steps independently by different processors. Every time an intermediary result is obtained after performance of a step, it is transmitted to the next processor and so on. When a step is completed, the processor in charge of performing it is freed and thus becomes available to process new data. Presupposing the respective durations of performance of the different steps to be substantially equal, the period required to obtain the final results is then the duration of performance of one step, and not the duration of performance of the task;

- array processor architectures or SIMD (Single Instruction, Multiple Data Stream) architectures. In this type of architecture, the increase in computational throughput is obtained by having the same instruction performed by a large number of identical processing units. This type of architecture is particularly well suited to vectorial processing; and

- multiprocessor architectures or MIMD (Multiple Instruction, Multiple Data Stream) architectures. In such an architecture, several processors perform respective streams of instructions independently of one another. Communication between the processors is ensured either by a common memory and/or by a network interconnecting the processors.

Pending European Patent Application No. 433,142 filed Dec. 6, 1990 discloses an architecture of a multiprocessor data processing system in which the bus is shared between plural processor stages and is interfaced in each stage by a programmable LCA Logic Cell Array configured into plural input/output means and a switching means. The main advantage of such an architecture is to dispense each processor from bus request and management tasks, the latter being carried out in the logic cells array associated with the processor. Nonetheless, this architecture is not optimal for the multiprocessor approach to scientific computation applications. Each processor is in fact entrusted with all the tasks to be performed (excepting management of the bus). Numerous multiprocessor applications require considerable computational means and a single unspecialized processor per stage restricts performances.

OBJECTS OF THE INVENTION

The main object of this invention is to remedy the preceding disadvantages.

Another object of this invention is to provide a data processing system optimizing the multiprocessor approach for each stage of the above-mentioned architecture.

SUMMARY OF THE INVENTION

Accordingly, there is provided a multiprocessor data processing system embodying the invention including a plurality of cascaded modules.

Each of the cascaded modules comprises

- a data processing unit connected to other data processing units in immediately adjacent downstream and upstream modules by way of a communication network. Each of the cascaded modules further comprises;
- a first memory,
- an additional processing unit,
- a second memory,
- a logic programmable cell array. The programmable logic cell array is configurable into first, second, third and fourth input/output interfaces for temporarily memorizing data into memorized data, and into a central processing and switching circuit for processing the memorized data into processed data and switching the processed data towards one of the input/output interfaces. Each cascaded module further comprises;
- a first module bus for interconnecting the data processing unit, the first memory and the first input/output interface, and
- a second module bus for interconnecting the additional processing unit, the second memory and the fourth input/output interface.

The second and third input/output interfaces in each of the modules are interconnected to the third input/output interface in the immediately adjacent downstream module and the second interface in the immediately adjacent upstream module by two intermodular buses, respectively.

According to another embodiment, given that, on the one hand, the processing and switching means is configurated for once and for all for a given application and, on the other hand, that several successive multiprocessor processings can be carried out by the processing units on a same data stream, the data already processed according to a first processing must be redistributed to the different modules for a next processing. In this case, the second and third input/output interfaces respectively in the programmable logic cell arrays of the last and first modules of the plurality of cascaded modules are connected by way of a feedback bus.

The invention also relates to a data processing method implemented in a multiprocessor data processing system embodying the invention. The method comprises:

- an first step further consisting in loading a respective set of weights into the second memory of each of the cascaded modules via the communication network, and the input data into the first memory of the first module, and
- at least one set of second and third steps,
- the second step consisting in carrying out partial processings on the input data in the additional processing unit of each cascaded module as a function of the respective set of matrix multiplication weights in order to determine partial data, and
- the third step consisting in downloading the partial data to any one of the programmable logic cell arrays or any one of the first and second memories in the cascaded modules via the intermodular buses and the feedback bus.

BRIEF DESCRIPTION OF THE DRAWINGS

Further features and advantages of the invention will be apparent from the following particular description of two preferred embodiments of this invention with reference to the corresponding accompanying drawings in which.

DESCRIPTION OF THE PREFERRED EMBODIMENTS

The multiprocessor data processing system embodying the invention is described hereinafter for a particular embodiment concerning artificial neural networks.

Figure 1:
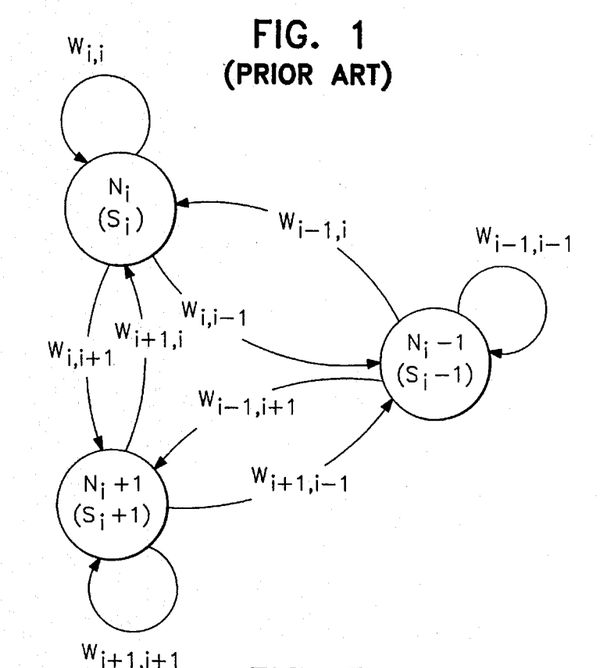
FIG. 1 is a modelized diagram of an artificial neural network.

A very general model representing a multilayer neural network is represented in FIG. 1: a certain number of elementary units . . . $N_{i-1}$, $N_i$, $N_{i+1}$ . . . called neurons and defined by their respective outputs . . . $S_{i-1}$, $S_i$, $S_{i+1}$ . . . constitute the nodes of the network. Each neuron $N_i$ is activated by a "potential" $V_i$ defined by the equation:

$$V_i = \sum_j W_{ji} \cdot S_j$$

in which $s_j$ represents an output level of a neuron $N_j$ "connected" to the neuron $N_i$, and $W_{ji}$ designates a synaptic weight of the connection between the neurons $N_j$ and $N_i$. With this potential $V_i$ is associated the output level $S_i$ corresponding to the neuron $N_i$ defined by the relation:

$$S_i(t+\Delta t) = f(V_i(t))$$

in which f is a non-linear function.

Figure 2:
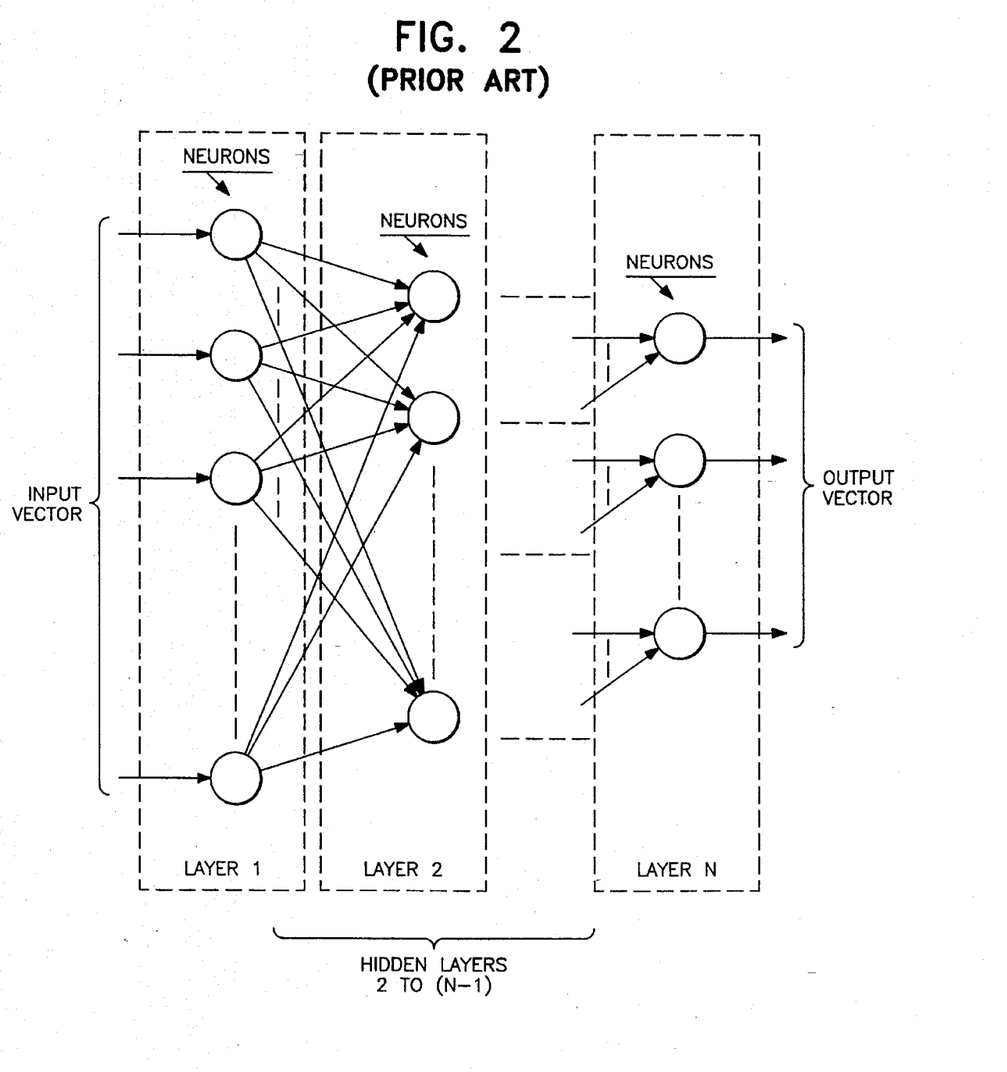
FIG. 2 is a diagram of a layered architecture of the modelized representation in FIG. 1.

In practice and by analogy with the human brain, these neurons are not organized anarchically, but are grouped in layers in the form of "columns", connections between two adjacent layers being assigned to a particular function, as shown in FIG. 2. This figure represents n layers of superimposed neurons comprising two end layers LAYER 1 and LAYER N, and (N−2) hidden layers LAYER 2 to LAYER (N−1) included between the two end layers. The end layer 1 is commonly called the "retina" or "input layer" and receives an input vector whereas the end layer LAYER N, or output layer, produces a corresponding output vector. In this representation, each neuron of a given layer n is connected to each of the neurons of the immediately adjacent upper layer (n+1), the integer n lying between 1 and N−1. As specified, with reference to FIG. 1, a respective synaptic weight W is attributed to each of these connections.

In practice, and by way of an example, the neural network can be used for recognition of digits such as 0, 1, 2, . . . , 8, 9. In this case, the input vector is a block of digital pixels of a digitized image of a given digit written by any person whomsoever. To each connection between neurons is attributed a respective synaptic weight W deduced during a learning phase of the network. These synaptic weights correspond to values of coefficients of multiplication matrix applied to pixels of the image. The output layer LAYER N produces an output vector which is a binary information identifying the "recognized" digit. Outputs of neurons of a respective layer produce a feature map which has "filtered" features of the feature map produced from the outputs of the neurons of the lower adjacent layer. Each step in the implementation of this model for the multiprocessor data processing system embodying the invention will be described in greater detail further on.

Figure 3:
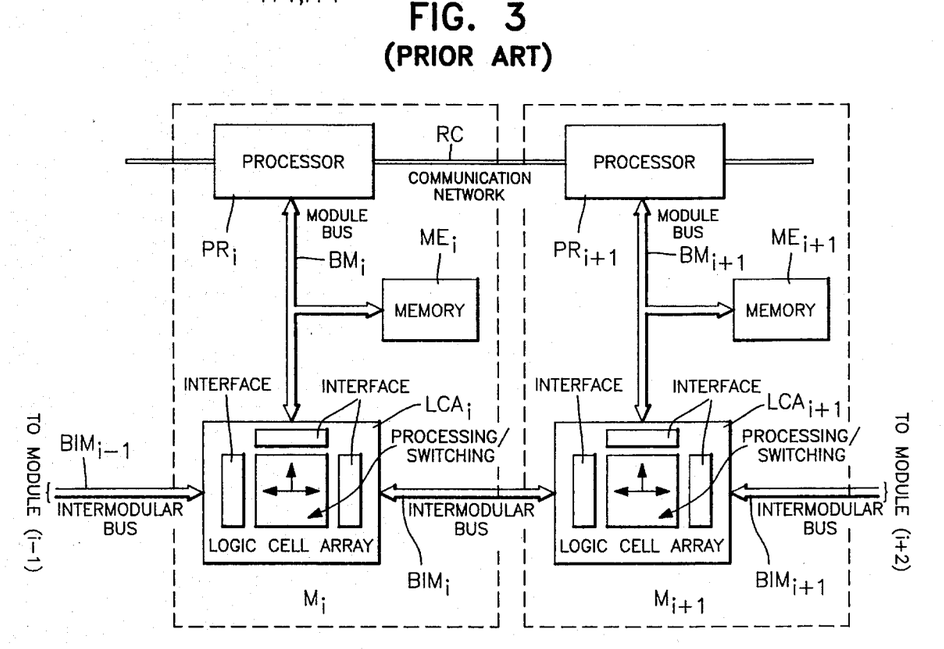
FIG. 3 is a block diagram of a multiprocessor data processing system with reconfigurable active bus according to the prior art.

A multiprocessor data processing system according to the prior art, as described in pending European Patent Application No. 433,142 filed Dec. 6, 1990, is shown in FIG. 3. The multiprocessor system comprises a plurality of modules in cascade, of which two adjacent modules $M_i$ and $M_{i+1}$ are represented in FIG. 3. Each of the modules $M_i$, $M_{i+1}$ includes a processor $PR_i$, $PR_{i+1}$, called a transputer, a RAM memory $ME_i$, $ME_{i+1}$ and a programmable logical cell array $LCA_i$, $LCA_{i+1}$. The respective processors of the various modules are interconnected by means of an interprocessor communication network RC. This communication network RC notably ensures the transfer of monitoring/control information between processors. For a given module $M_i$, the processor $PR_i$, the memory $ME_i$ and the logic cell array $LCA_i$ are interconnected by means of a respective module bus $BM_i$. This module bus $BM_i$ is composed of three specialized elementary buses which are a data bus, an address bus and a control bus, and interconnects the processor, the memory and a first input/output interface in the logic cell array $LCA_i$. Programmable logic cell arrays (LCA) are known to those skilled in the art and are constituted by configurable logic, combinational and sequential circuits. The configuration of the programmable logic cell array ($LCA_i$) is set up by the module processor $PR_i$.

According to the above-mentioned architecture, the programmable logic cell array is configured into three input/output interfaces and a central data processing and switching circuit (hereinafter, the central circuit). The input/output interfaces notably carry out temporary data storage functions. The central circuit ensures data switching functions between the interfaces, and elementary processing functions (data format modification, encoding, precomputed functions) e.g. in pipeline mode. The first interface of the logic cell array constitutes the interface between the module bus $BM_i$ and the central circuit whereas the second and third interfaces respectively interface the central circuit with two intermodular buses $BIM_i$ and $BIM_{i-1}$. The buses $BIM_i$ and $BIM_{i-1}$ are then respectively connected with a third interface in the logic cell array of an immediately adjacent downstream module $M_{i+1}$ and a second interface in the logic array of an immediately adjacent upstream module $M_{i-1}$.

The introduction of a programmable logic cell array in each module of such a multiprocessor architecture is particularly interesting in that its induces a fine grain of parallelism between modules while assigning the low-level tasks (access to the intermodular bus, elementary functions) to the logic array $LCA_i$.

Figure 4A:
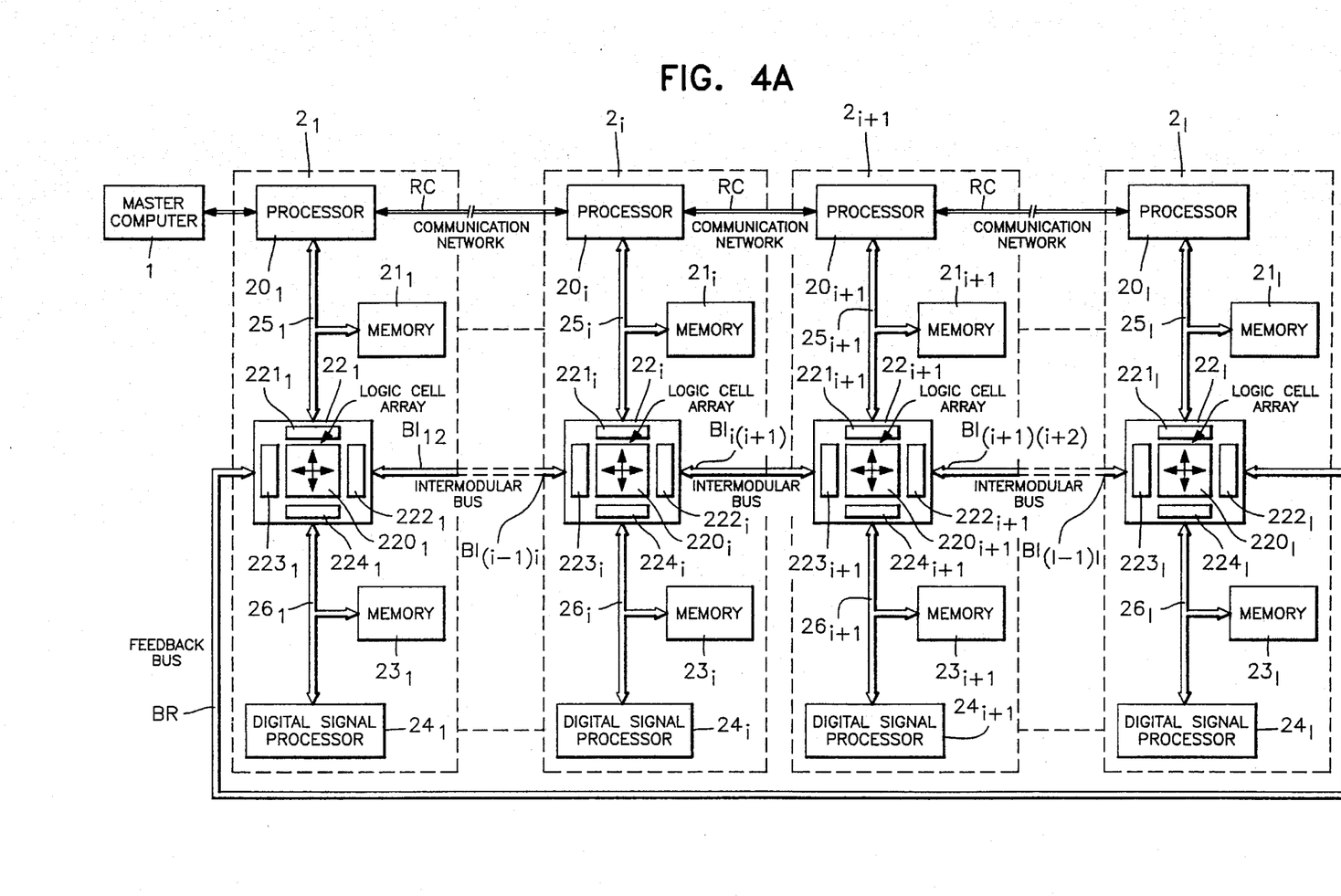
FIGS. 4A and 4B are two respective block diagrams of two embodiments of a data processing system with specialized coprocessor embodying the invention.

FIG. 4A shows the first embodiment of a data processing system according to the invention for the carrying out of an artificial neural network within the scope e.g. of recognition of digits included between 0 and 9. The system comprises I modules $2_1$ to $2_I$ in a cascaded architecture.

Each module $2_i$, i being an integer varying between 1 and I, comprises a data processing unit in the form of a processor $20_i$, a first RAM type memory $21_i$, a programmable logic cell array $22_i$, a second memory $23_i$, and a digital signal processor constituting a coprocessor or dedicated specialized processing unit $24_i$. Within the module $2_i$, the processor $20_i$, the memory $21_i$ and an input/output interface $221_i$ of the programmable logic cell array $22_i$ are interconnected by means of a common module bus $25_i$. Typically, this common bus is constituted by the three elementary buses, i.e., address bus, data bus and control bus.

By comparison with the foregoing description in reference to the prior art according to FIG. 3, the programmable logic cell array $22_i$ is programmed into four input/output interfaces $221_i$, $222_i$, $223_i$ and $224_i$ and a central data processing and switching circuit $220_i$. According to this embodiment, the input/output interfaces $221_i$ to $224_i$ principally constitute temporary storage means or buffer means. The central circuit $220_i$ is configured to switch data from and to the input/output interfaces $221_i$ to $224_i$, and to conduct elementary processing of the data received through the input/output interfaces.

The first input/output interface $221_i$ is connected to the module bus $25_i$. This input/output interface $221_i$ is e.g. used for:

temporary storage of data transmitted by the processor $20_i$ in order to free the latter for other tasks; and direct memory access (DMA) to the memory $21_i$ connected to processor $20_i$ by means of the logic cell array $22_i$.

The second and third interfaces $222_i$ and $223_i$ in the logic cell array $22_i$ of the ith module $2_i$ are respectively connected to a third input/output interface $223_{i+1}$ of an immediately adjacent downstream module $2_{i+1}$, and a second input/output interface $222_{i-1}$ of an immediately adjacent upstream module $2_{i-1}$. These connections are respectively made by means of two intermodular buses $BI_{i(i+1)}$ and $BI_{(i-1)i}$. The I programmable logic cell arrays are thus cascaded by means of intermodular buses $BI_{12}, \ldots, BI_{(I-1)I}$. According to this first preferred embodiment, the third input/output interface $223_1$ of the first module $2_1$ and the second interface $222_I$ of the $I^{th}$ module $2_I$ are connected by a feedback bus BR.

The intermodular buses $BI_{12}$ to $BI_{(I-1)I}$ in series with the feedback bus BR thus constitute a ring. The second and third interfaces $222_i$ and $223_i$ can e.g. be used during a transmission of data between processors $20_i$ of non-adjacent modules and thus confer high-speed communication node functions upon the logic cell arrays $22_i$.

In each module $2_i$, the digital signal processor $24_i$, the second memory $23_i$ and the fourth input/output interface $224_i$ are interconnected by means of a common bus $26_i$.

With reference to FIGS. 5, 6, 7 and 8, the operation of the data processing system embodying the invention will now be described for the preferred embodiment concerning artificial neural networks.

Figure 5:
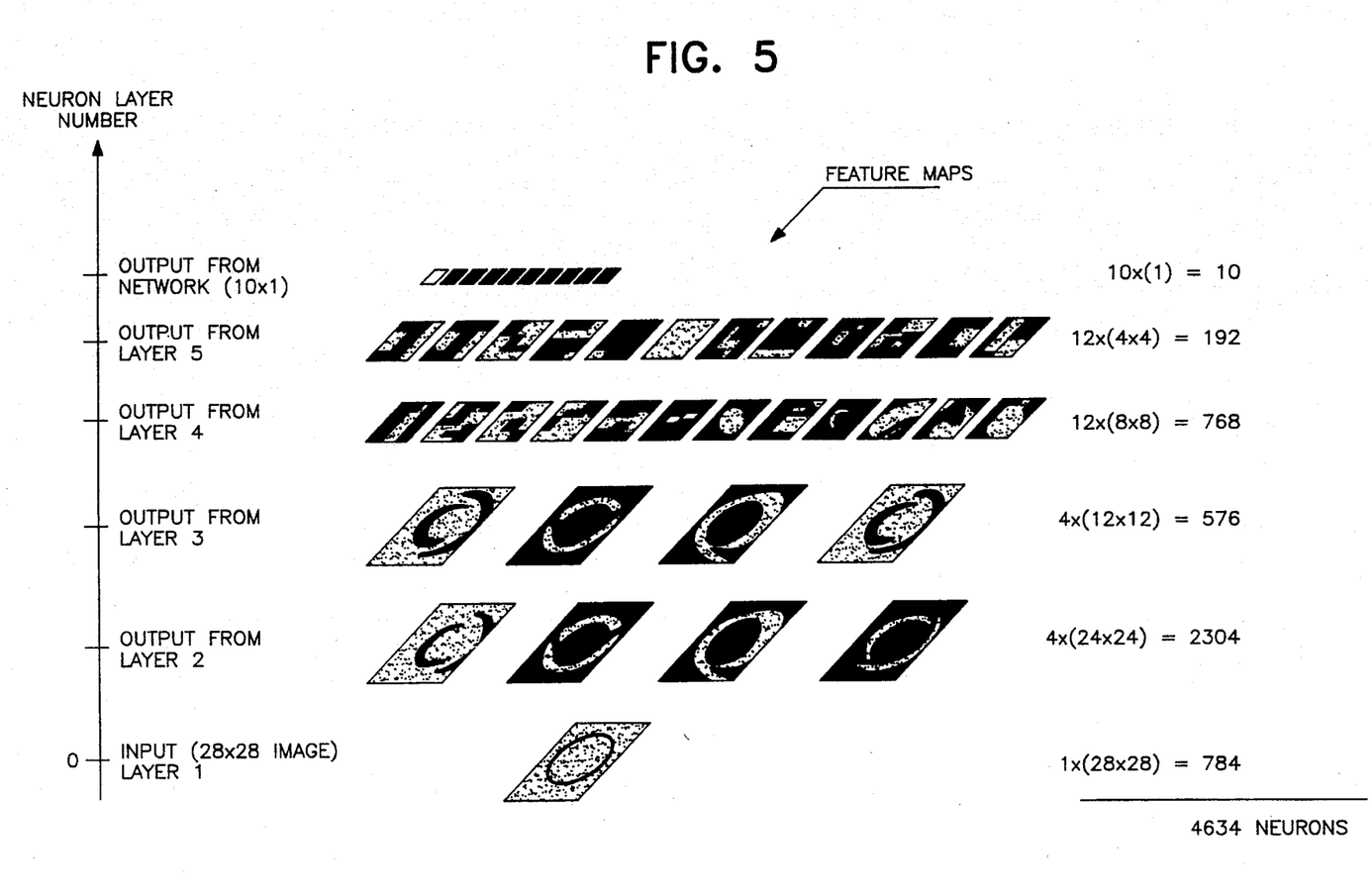
FIG. 5 is a diagram of feature maps obtained for successive processings in the layers of an artificial neural network.

FIG. 5 shows typical results obtained within the scope of artificial neural networks for the recognition of handwritten digits included between 0 and 9. Such an application can e.g. concern the recognition of zipcodes for "automated" postal distribution. In the diagram in FIG. 5, the vertical ordinate axis relates to the numbers of neuron layers in an architecture such as that presented in reference to FIG. 2. In this diagram, the number of neuron layers is presupposed equal to 5. The input vector is an input block having (28 by 28) pixels representing any digit whatsoever, 0 in this instance, written by a person and digitized. The network is composed of 4,634 neurons.

Each neuron in the input layer (LAYER 1), called retina, respectively receives a pixel of the input vector. The first hidden layer LAYER 2 is divided into 4 sub-layers of (24 by 24) neurons. Each neuron of each sub-layer receives (5 by 5) neighboring pixels of the input block after multiplication by a line matrix of respective synaptic weights. It is recalled that these synaptic weights are used for processing into matrix multiplication coefficients. Four blocks of (24 by 24) pixels are thus supplied by the respective outputs of the four sub-layers of neurons of LAYER 1.

The synaptic weights applied between the outputs of the neurons of the layer LAYER 1 and the four sub-layers of the second layer LAYER 2 relate to specific processings on the image of (28 by 28) input block pixels. Respective synaptic weights between the four sub-layers of LAYER 2 and four sub-layers of LAYER 3 relate to averaging and subsampling by two processings. Respective outputs of the neurons of the four sub-layers of LAYER 3 thus produce four image blocks of (12 by 12) pixels.

Details of LAYER 3 and LAYER 4 will not be provided. It should nevertheless be remarked that the role of each layer consists in extracting fundamental features from the digitalized (28 by 28) pixel block of a handwritten digit. As shown in FIG. 5, an output layer of 10 neurons produces ten pixels in black and white, the rank of the sole white pixel produced by one of the ten neurons being representative of the "recognized" input digit subsequent to the various "digital filtering" steps respectively performed by the neuron layers.

In reference to FIGS. 6, 7 and 8, the installation of an artificial neural network in the multiprocessor data processing system embodying the invention, as shown in FIG. 4A, will now be described. According to this preferred embodiment, the neural network comprises three layers of 256, 40 and 10 neurons respectively. The neurons of the first layer, called input layer, and of the second layer each set up connections (each assigned to a respective synaptic weight) respectively with each of the neurons of the immediately adjacent upper layer, i.e., the second layer and the third layer, called output layer. The input vector is a block of (16×16)=256 pixels of a digitalized image of a handwritten digit included between 0 and 9.

Figure 6:
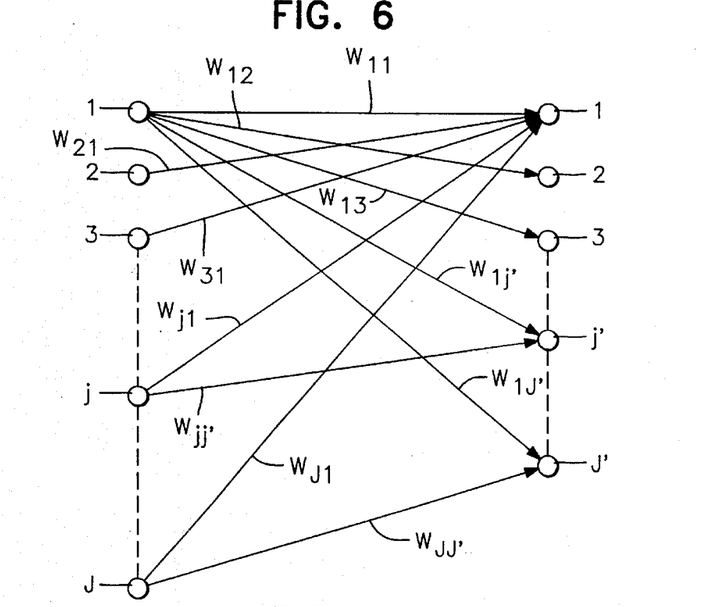
FIG. 6 is a diagram of connections associated with synaptic weights between two adjacent layers of an artificial neural network.
Figure 7:
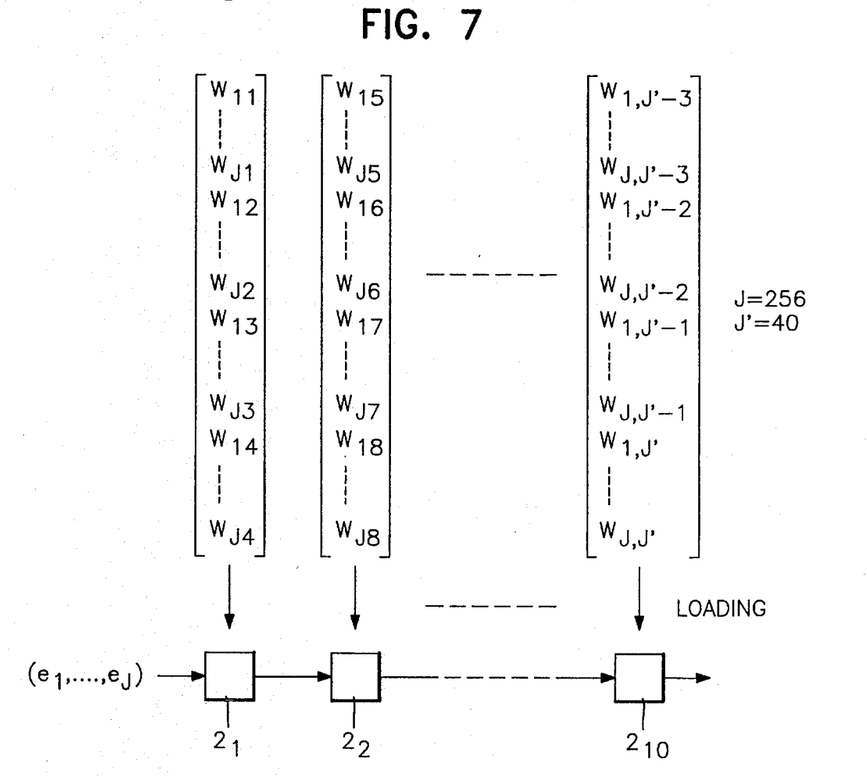
FIG. 7 is a loading diagram of synaptic weights relating to two successive layers in a data processing system according to a preferred embodiment of the invention.

As shown in FIG. 6, all the connections assigned to respective synaptic weights between two adjacent layers respectively having J and J' neurons are fully defined by a single rectangular matrix of size (J×J'). Each weight $W_{jj'}$ of the rectangular matrix, j being included between 1 and J, and j' between 1 and J', corresponds to a value of a synaptic weight of the connection between a neuron of rank j and a neuron of rank j' of the two adjacent layers respectively.

In compliance with the preferred embodiment, two respective matrices of (J×J')=(256×40) and (J×J')=(4×10) synaptic weights between the first and second layers and between the second and third layers are then used, i.e., a total of 10,640 weights or connections.

For indicative purposes, these synaptic weights for particular embodiments (recognition of digits, ...) are obtained during a learning phase by a gradient back-propagation algorithm. Summarily, this algorithm performs the recognition computations for synaptic weights given initially. The results of these computations are compared to expected recognition results. The weights are modified taking this comparison into account. After several iterations, the synaptic weights converge towards optimal recognition values. This learning phase is generally very costly as regards time.

According to the first preferred embodiment, the data processing system embodying the invention (FIG. 4A) comprises I =10 modules $2_1$ to $2_{10}$. In a first step, as shown schematically in FIG. 7, each module $2_i$, i lying between 1 and 10, is assigned to the processing relating to all the connections between the input layer and respectively one of the ten quadruplets of neurons in the second layer (4×10= 40). The matrix computations:

$$V_p = \sum_k W_{kp} e_k,$$

where k varies between 1 and J=(16×16) and p varies between 1 and J'=40,
are carried out by the same digital signal processor for four set values of the index p, and therefore in relation to the four neurons of a respective quadruplet.

One advantage of the invention is that these matrix multiplications are performed by the digital signal processors $24_i$ to $24_{I=10}$.

Further to this first processing (connections between the first and second layers), each digital signal processor $24_i$ to $24_{10}$ is assigned to the processing of the matrix multiplications relating to the connections between the neurons of the second layer and a respective neuron of the third layer, called output layer (1×10=10).

The utilisation of a digital signal processor or specialized coprocessor $24_i$ frees the processor $20_i$ which can perform other tasks.

In reference to FIGS. 8 and 4A, the implementation and operation of an artificial neural network in the multiprocessor data processing system embodying the invention will now be described.

Prior to the operation of the system as an artificial neural network in the recognition mode, the system is initiated at the initiative of a master computer 1 connected to the first processor $20_1$. This initiation is established by the computer 1 via the interprocessor communication network RC. The initiation comprises:

with regard to each processor $20_1$ to $20_{10}$:
  loading of an operating program in the respective memory $21_1$ to $21_{10}$ via the bus $25_1$ to $25_{10}$;
  configurating of the associated logic cell array $22_1$ to $22_{10}$;
  loading of programs (matrix multiplication, . . . ) relating to the operation of the digital signal processor $24_1$ to $24_{10}$ in the associated memory $23_1$ to $23_{10}$ via the network $22_1$ to $22_{10}$, and
  loading of a respective set of synaptic weights such as previously described and relating to the digital signal processor $24_1$ to $24_{10}$, in the associated memory $23_1$ to $23_{10}$;
as well as the loading of the first input vector constituting input data $e_1$ to $e_J$ to be recognized by processing (block of 16 by 16 pixels), in the memory $21_1$ of the processor $20_1$ of the first module $2_1$.

In the case of a sequential processing of plural input data vectors to be recognized, the latter are memorized as they become available in the memory $21_1$ connected to the processor of the first module $2_1$. Each of the input vectors is e.g. supplied by the master computer 1 subsequent to a preprocessing (linear processing to normalize the 16 by 16 size of the initial blocks supplied by a video camera) on the initial blocks via the communication network RC.

Figure 8:
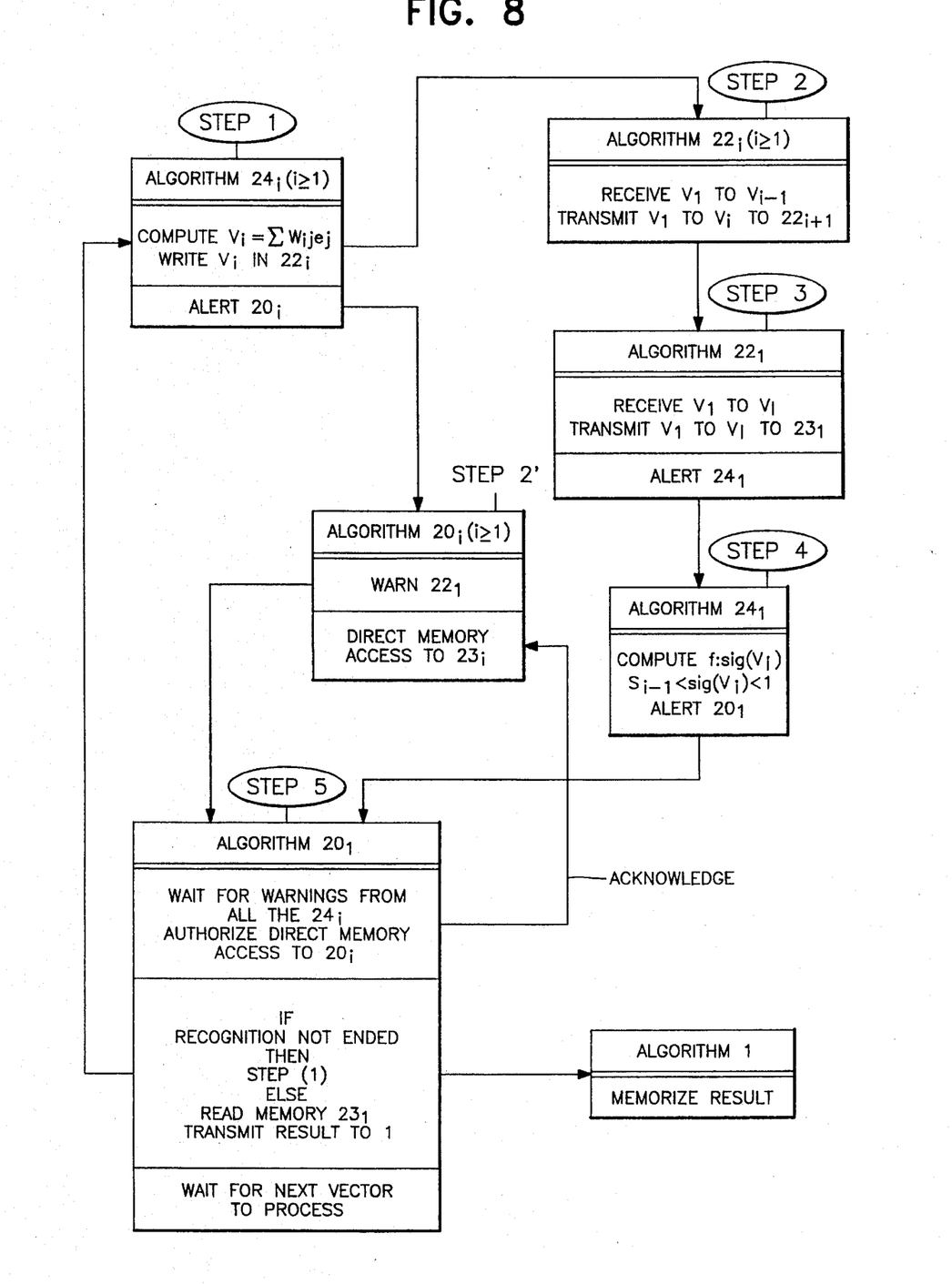
FIG. 8 is a diagram of algorithms relating to the processing of the connections between two successive layers used in the system according to FIG. 7.

The diagram of algorithms relating to a first processing of connections between first and second layers of neurons in FIG. 8 enables the operation of the multiprocessor data processing system embodying the invention as an artificial neural network to be grasped. Each of the "tables " in FIG. 8 relates to an algorithm performed by one or more of the processors $20_i$, digital signal processors $24_i$, or logic cell arrays $22_i$ of the system.

It has been seen previously that the input data vector is initially loaded in the memory $21_1$. The processor $20_1$ reads this vector in the memory $21_1$ and writes it in the first input/output interface $221_1$ of the programmable logic cell array $22_1$ of the first module $2_1$. The central processing and switching circuit $220_1$ of network $22_1$ then switches this vector towards the second interface $222_1$ and this second interface $222_1$ retransmits it to the third interface $223_2$ of the logic cell array $22_2$ of the second module $2_2$ and so on so forth. The vector is thus broadcast in the ring $BI_{12}$ to $BI_{(I-1)I}$ successively to the adjacent modules immediately above. Each of the central means of the networks switches and takes via the fourth interface $224_i$ the set of (16 by 16) pixels of the vector towards the memory $23_i$ associated with its digital signal processor $24_i$. The data input vector used by each module $2_i$ in the configuration previously described is thus memorized in the respective memory $23_i$ associated with the digital signal processor $24_i$.

The first step (step 1) of the algorithm relating to each of the digital signal processors $24_i$, with i lying between 1 and I, consists in computing the potential $V_i$ relating to the neurons attributed to the module $2_i$, then in writing the potential thus computed in the input/output interface $224_i$ of the logic cell array $22_i$ of the same module $2_i$. Each $220_i$ of the central circuit of the logic cell arrays configured for this purpose gradually transmits the results of the potential computations $V_1$ to $V_i$ to the next logic cell array $22_{i+1}$ until all the results $V_1$ to $V_I$ have been received by the third input/output interface $223_i$ of the logic cell array of the first module $2_1$ via the feedback bus BR (step 2).

Then the input/output interface $223_i$ of the first module $2_1$ writes the potential computation results received in the memory $23_1$ and alerts the digital signal processor $24_i$ (step 3). The processor $24_1$ computes the value of the sigmoid function (non-linear f function based on hyperbolic tangent functions defined from the model initially presented in the specification) for each "pixel " or neuron potential $V_i$ produced by the processors $24_i$ (step 5) for obtaining the output levels of all the neurons in the second layer for this first processing. At the same time and as each digital signal processor $24_i$ writes the computed potentials specific to the four neurons of the second layer which it simulates in this first processing, in the associated memory $23_i$, the processors $20_1$ to $20_I$ then read the neuron potentials respectively memorized in the memories $23_1$ to $23_I$ when all the potentials have been computed (step 2').

According to the embodiment, two processings relating to the first and second layers and to the second and third layers are provided. In this way the outputs of the neurons in the second layer of the chosen configuration memorized in the memory $23_i$ are reprocessed by the digital signal processors $24_1$ to $24_I$ for new potential computations after broadcasting in the ring of the neuron outputs as computed during the first processing.

Figure 4B:
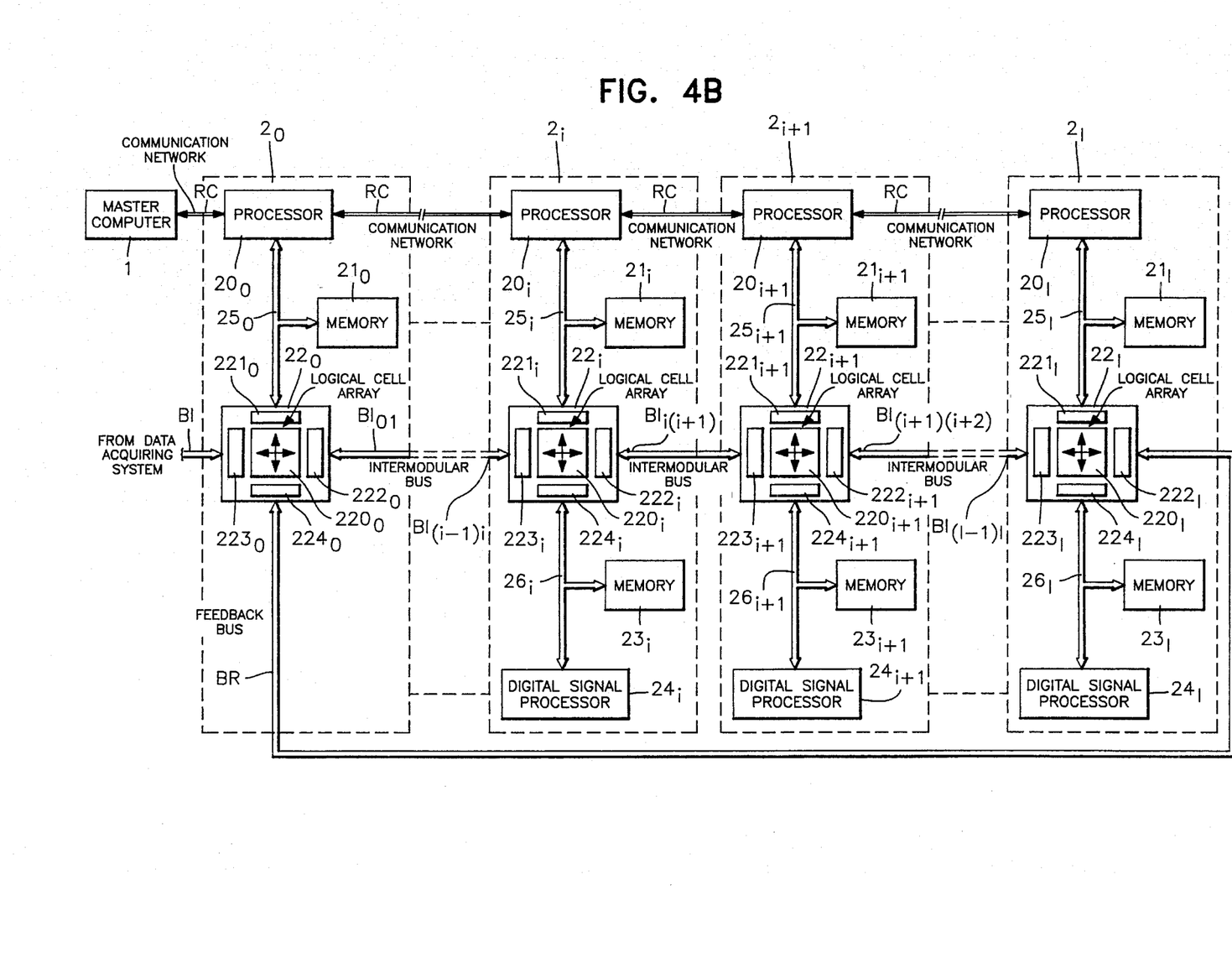

According to the second embodiment shown in FIG. 4B, the addition of an additional module $2_0$ to the initial modules $2_1$ to $2_I$ is proposed upstream of the latter. This additional module comprises a processor $20_0$, a memory $21_0$ and a programmable logic cell array $22_0$. This module is provided in order to directly inject the pixel images to be processed into an input/output interface $223_0$ of the programmable logic cell array $22_0$. This injection enables an increase of the flow of images to be processed since the images then do not transit via the master computer 1 and, furthermore, do not require utilisation of the communication network RC. A data (images) acquiring system, such as a video camera or scanner (not shown), is then directly connected to the third input/output interface $223_0$ of the programmable array $22_0$ of the additional module $2_0$ via a bus BI. The memory $21_0$, the processor $20_0$ and a first input/output interface $221_0$ of the programmable logic cell array $22_0$ in the additional module $2_0$ are interconnected in identical manner to the interconnections in the other modules $2_1$ to $2_I$, by means of a bus $25_0$. The images to be processed which are injected via a bus in the third input/output interface $223_0$ of the programmable logic cell array $22_0$ can undergo a first preprocessing (16 by 16 formatting), in a processing and switching circuit $220_0$ of the logic cell array $22_0$ by programming of the latter. The second interface $222_0$ is connected to the third interface $223_1$ of the first $2_1$ of the modules in cascade $2_1$ to $2_I$, via an additional intermodular bus $BI_{01}$.

For identical reasons to those of the first embodiment, a feedback bus BR can also be provided. The latter interconnects the second input/output interface $222_I$ of the programmable logic cell array $22_I$ of the last module $2_I$ to the fourth input/output interface $224_0$ of the logic cell array $22_0$ of the additional module.

For indicative purposes, a recognition of a digitized handwritten digit in (16 by 16) pixels by the data processing system embodying the invention simulating 10,640 neurons requires 175 μs. Durations of the order of a tenth of millisecond are usually required for conventional systems.

What we claim is:

1. An input data processing method implemented in a multiprocessor data processing system, said multiprocessor data processing system comprising a plurality of cascaded modules, each of said cascaded modules comprising:

a data processing unit connected to other data processing units in immediately adjacent downstream and upstream modules by means of a communication network, a first memory for storing data, an additional processing unit, a second memory for storing data associated with said additional processing unit, a programmable logic cell array configurable into first, second, third and fourth input/output interfacing means for temporarily memorizing data into memorized data, and into a central processing and switching means for processing said memorized data into processed data and switching said processed data towards one of said input/output interfacing means, a first module bus for interconnecting said data processing unit, said first memory and said first input/output interfacing means, and a second module bus for interconnecting said additional processing unit, said second memory and said fourth input/output interfacing means, said second and third input/output interfacing means in said each of said cascaded modules being interconnected to the third input/output interfacing means in said immediately adjacent upstream module and the second input/output interfacing means in said immediately adjacent downstream module, by two intermodular buses, respectively, said second and third input/output interfacing means respectively in said programmable logic cell array of a last module and a first module in said plurality of said cascaded modules being connected by means of a feedback bus, said input data processing method comprising:

a first step further consisting in loading a respective set of matrix multiplication weights into said second memory of each of said cascaded modules via said communication network and said input data into said first memory of said first module, and at least one set of second and third steps in each of said cascaded modules, said second step consisting in carrying out partial processings on said input data in said additional processing unit of said each cascaded module as a function of said respective set of matrix multiplication weights for determining partial data, and said third step consisting in downloading said partial data to any one of said programmable logic cell arrays or any one of said first and second memories in said cascaded modules via said intermodular buses and said feedback bus.

2. An input data processing method implemented in a multiprocessor data processing system, said multiprocessor data processing system comprising a plurality of cascaded modules, each of said cascaded modules comprising:

a data processing unit connected to other data processing units in immediately adjacent downstream and upstream modules by means of a communication network, a first memory for storing data, an additional processing unit, a second memory for storing data associated with said additional processing unit, a programmable logic cell array configurable into first, second, third and fourth input/output interfacing means for temporarily memorizing data into memorized data, and into a central processing and switching means for processing said memorized data into processed data and switching said processed data towards one of said input/output interfacing means, a first module bus for interconnecting said data processing unit, said first memory and said first input/output interfacing means, a second module bus for interconnecting said additional processing unit, said second memory and said fourth input/output interfacing means, said second and third input/output interfacing means in said each of said cascaded modules being interconnected to the third input/output interfacing means in said immediately adjacent downstream module and the second input/output interfacing means in said immediately adjacent upstream module by two intermodular buses, respectively, and an additional module, a data acquiring means and an additional intermodular bus, said additional module including a data processing unit, a first memory and a programmable logic cell array configurable into first, second, third and fourth input/output interfacing means, said acquiring means being interconnected with said third input/output interfacing means in said programmable logic cell array of said additional module, said additional intermodular bus interconnecting said second input/output interfacing means in said programmable logic cell array of said additional module and said third input/output interfacing means in a first of said plurality of said cascaded modules, wherein said second input/output interfacing means in said programmable logic cell array of the last module in said plurality of said cascaded modules and said fourth input/output interfacing means in said additional module are connected by means of a feedback bus, said input data processing method comprising:

a first step further consisting in loading a respective set of matrix multiplication weights into said second memory of each of said cascaded modules via said communication network and said input data into said first memory of said first module, and at least one set of second and third steps in each of said cascaded modules, said second step consisting in carrying out partial processings on said input data in said additional processing unit of said each cascaded module as a function of said respective set of matrix multiplication weights for determining partial data, and said third step consisting in downloading said partial data to any one of said programmable logic cell arrays or any one of said first and second memories in said cascaded modules via said intermodular buses and said feedback bus.

* * * * *